United States Patent
Butt et al.

(10) Patent No.: US 7,827,544 B2
(45) Date of Patent: *Nov. 2, 2010

(54) UPDATING ELEMENTS IN A DATA STORAGE FACILITY USING A PREDEFINED STATE MACHINE, WITH PARALLEL ACTIVATION

(75) Inventors: Edward G. Butt, Tucson, AZ (US); Franck Excoffier, Tucson, AZ (US); Steven D. Johnson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1392 days.

This patent is subject to a terminal disclaimer.

(21) Appl. No.: 10/992,176

(22) Filed: Nov. 18, 2004

(65) Prior Publication Data

US 2006/0112387 A1    May 25, 2006

(51) Int. Cl.
G06F 9/44 (2006.01)
G06F 9/445 (2006.01)
G06F 7/00 (2006.01)

(52) U.S. Cl. ................ 717/168; 717/169; 717/171; 717/172; 717/174; 717/175; 717/176; 717/177; 707/610; 707/638

(58) Field of Classification Search .................. None
See application file for complete search history.

(56) References Cited

U.S. PATENT DOCUMENTS

| | | | |
|---|---|---|---|
| 4,607,332 A | 8/1986 | Goldberg | |
| 5,253,344 A | 10/1993 | Bostick et al. | |
| 5,608,893 A * | 3/1997 | Slingwine et al. | 711/141 |
| 5,694,617 A | 12/1997 | Webb et al. | |
| 6,079,013 A | 6/2000 | Webb et al. | |
| 6,119,219 A | 9/2000 | Webb et al. | |
| 6,205,526 B1 * | 3/2001 | Tanuma | 711/162 |
| 7,073,017 B2 * | 7/2006 | Yamamoto | 711/103 |
| 7,266,815 B2 * | 9/2007 | Butt et al. | 717/168 |
| 2004/0205776 A1 | 10/2004 | Harrington et al. | |
| 2004/0255286 A1 * | 12/2004 | Rothman et al. | 717/168 |
| 2005/0289072 A1 * | 12/2005 | Sabharwal | 705/59 |
| 2006/0026304 A1 * | 2/2006 | Price | 710/8 |

FOREIGN PATENT DOCUMENTS

JP    2000-148465    5/2000

OTHER PUBLICATIONS

TDB-ACC-No: NA92098, Entry Point Table for Licensed Internal Code, Sep. 1, 1992, vol. 34, issue 4A, pp. 8-10.

* cited by examiner

*Primary Examiner*—Insun Kang
(74) *Attorney, Agent, or Firm*—Scully, Scott, Murphy & Presser, P.C.; Kurt Goudy, Esq.

(57) ABSTRACT

A technique for updating elements in a data storage facility, including a single server or a multi-server system, such as by providing updated internal code packages to the elements. The update is performed using a fixed state machine, where the elements are updated in a coordinated manner within the constraints of the state machine. In a multi-server device, the code packages are distributed to elements associated with the different servers in one traversal of the state machine, during distribute states of the state machine. The distributed code packages are activated in activate states of the state machine in one traversal of the state machine, so there is parallel activation. The code packages can be grouped in a flexible way by configuring an external update bundle used by the state machine. The distributing of the code is based on the grouping.

38 Claims, 4 Drawing Sheets

FIG. 3

| STATE | POWER | SERVICE PROCESSOR GROUPS | AIX | AIX-PTF | AIX-EFIX | SFI | HAs | DAs | SE | DDMs |
|---|---|---|---|---|---|---|---|---|---|---|
| S-1 | 1 | 18 | | | | | 146 | 172 | 198 | 215 |
| S-2 | 2 | 19 | | | | | 147 | 173 | 199 | 216 |
| S-3 | 3 | 20 | | | | | 148 | 174 | 200 | 217 |
| S-4 | 4 | 21 (S0,S1) | 54 (S0,S1) | 55 (S0,S1) | 56 (S0,S1) | 57 (S0,S1) | 149 (S0,S1) | 175 (S0,S1) | 201 (S0,S1) | 218 (S0,S1) |
| S-5 | 5 | 22 (S0,S1) | 58 (S0,S1) | 59 (S0,S1) | 60 (S0,S1) | 61 (S0,S1) | 150 (S0,S1) | 176 (S0,S1) | 202 (S0,S1) | 219 (S0,S1) |
| S-6 | 6 | 23 (S0,S1) | 62 (S0,S1) | 63 (S0,S1) | 64 (S0,S1) | 65 (S0,S1) | 151 (S0,S1) | 177 (S0,S1) | 203 (S0,S1) | 220 (S0,S1) |
| S-7 | 7 | 24 (S0,S1) | 66 (S0,S1) | 67 | 68 (S0,S1) | 69 (S0,S1) | 152 (S0,S1) | 178 (S0,S1) | 204 (S0,S1) | 221 (S0,S1) |
| S-8 | 8 | 25 | 70 | 71 | 72 | 73 | 153 (S0,S1) | 179 (S0,S1) | 205 (S0,S1) | 222 (S0,S1) |
| S-9 | 9 | 26 | (S0) / 74 | (S0) / 75 | (S0) / 76 | (S0) / 80 | (HA1) / 154 | (DA1) / 180 | 206 | (DDM1) / 223 |
| S-10 | 10 | 27 (S0) / 28 | (S1) / 77 | (S1) / 78 | (S1) / 79 | (S1) / 81 | (HA2) / 163 | (DA2) / 189 | 207 | (DDM2) / 232 |
| S-11 | 11 | 29 | 82 | 83 | 84 | 88 | 155 | 181 | 208 | 224 |
| S-12 | 12 | 30 | 90 | 91 | 92 | 96 | 156 | 182 | 209 | 225 |
| S-13 | 13 | 31 | 98 | 99 | 100 | 104 | 157 | 183 | 210 | 226 |
| S-14 | 14 | 32 | 106 | 107 | 108 | 112 | 158 | 184 | 211 | 227 |
| S-15 | 15 | 33 | 114 | 115 | 116 | 120 | 159 | 185 | 212 | 228 |
| S-16 | 16 | 34 | 122 | 123 | 124 | 128 | 160 | 186 | 213 | 229 |
| S-17 | 17 | | 130 | 131 | 132 | 136 | 161 | 187 | | 230 |

(Continuing rows visible: 35, 36, 37, 38, 39, 40, 41 in Service Processor Groups column; 138/139/140/144, 141/142/143/145 etc., 162/171, 188/197, 214, 231/240)

Additional entries:
- Service Processor Groups S-10 (S1): 35; then 36, 37, 38, 39, 40, 41
- AIX: 138; AIX-PTF: 139; AIX-EFIX: 140; SFI: 144
- AIX: (next rows) 141; 142; 143; 145
- HAs: 162, 171
- DAs: 188, 197
- SE: 214
- DDMs: 231, 240 (with intermediate 233–239)

UPDATING ELEMENTS IN A DATA STORAGE FACILITY USING A PREDEFINED STATE MACHINE, WITH PARALLEL ACTIVATION

CROSS-REFERENCE TO RELATED APPLICATIONS

This application is related to commonly-assigned U.S. patent application No. 10/992,157, to Edward G. Butt, et al., filed Nov. 18, 2004, now patented (U.S. Pat. No. 7,747,573), entitled "Updating Elements In A Data Storage Facility Using A Predefined State Machine, With Serial Activation".

BACKGROUND OF THE INVENTION

1. Field of the Invention

The invention relates generally to the field of data storage in computer systems and, more specifically, to a technique for updating elements in a multi-server data storage facility using a state machine.

2. Description of the Related Art

Storage facilities such as storage servers as commonly used by corporations and other organizations have high-capacity disk arrays to store large amounts of data from external host systems. A storage facility may also backup data from another storage facility, such as at a remote site. The IBM® Enterprise Storage Server (ESS) is an example of such a storage facility. Such facilities can access arrays of disks or other storage media to store and retrieve data. Moreover, redundant capabilities may be provided as a further safeguard against data loss. For example, a dual server system includes two separate servers that can access the same storage disks.

Moreover, storage facilities include several subsystems and components, referred to as updateable elements, each requiring its own unique update image and update commands. The elements are updated from time to time to provide new features or fix problems, for instance. Elements that may be updated include host adapters, device adapters, service processors, storage disks, power components, and so forth.

However, there is a need for greater flexibility in the update process, particularly when the update process is carried out using a fixed state machine.

BRIEF SUMMARY OF THE INVENTION

To address these and other issues, the present invention describes a technique for updating elements in a data storage facility, including a single server or a multi-server system, such as by providing updated internal code to the elements. The update is performed using a fixed state machine, where the elements are updated in a coordinated manner within the constraints of the state machine. The update includes code distribution and/or code activation. Groups of code packages can be identified in a flexible way such that the code is distributed and/or activated according to the group. Additionally, the distributed code can be activated for multiple servers at the same time.

In one aspect, the invention provides a method for deploying computing infrastructure, comprising integrating computer-readable code into a computing system comprising a data storage facility having at least a first server with an associated updateable element, and a second server with an associated updateable element, where the code in combination with the computing system is capable of coordinating update actions in the storage facility by performing a method. The method includes setting a sequence for distributing a plurality of code packages to the associated updateable elements of the first and second servers according to different states of a fixed state machine, wherein the states are traversed in sequence, and include at least one distribute state for distributing at least a portion of the plurality of code packages, and at least one activate state for activating the at least a portion of the plurality of code packages after it is distributed to the associated updateable elements of the first and second servers, distributing the at least a portion of the plurality of code packages to the associated updateable elements of the first and second servers according to the sequence, and during the at least one distribute state, and activating, during the at least one activate state, and in a single traversal of the state machine, the at least a portion of the plurality of code packages that was distributed to the associated updateable elements of the first and second servers in the distributing step.

In a further aspect, a method of the first-mentioned above type includes grouping at least two of the plurality of code packages, distributing, responsive to the grouping, the at least a portion of the plurality of code packages to the associated updateable elements of the first and second servers according to the sequence, and during the at least one distribute state, and activating, responsive to the grouping, during the at least one activate state, and in a single traversal of the state machine, the at least a portion of the plurality of code packages that was distributed to the associated updateable elements of the first and second servers in the distributing step.

In a further aspect, a method of the first-mentioned above type includes distributing the at least a portion of the plurality of code packages to the associated updateable elements of the first and second servers according to the sequence, during the at least one distribute state, and during a single traversal of the state machine, and activating, during the at least one activate state, and during the single traversal of the state machine, the at least a portion of the plurality of code packages that was distributed to the associated updateable elements of the first and second servers in the distributing step.

Related program storage devices and data storage facility apparatuses may also be provided.

BRIEF DESCRIPTION OF THE DRAWINGS

These and other features, benefits and advantages of the present invention will become apparent by reference to the following text and figures, with like reference numbers referring to like structures across the views, wherein:

FIG. 3 illustrates a matrix showing an update process;

DETAILED DESCRIPTION OF THE INVENTION

As mentioned, from time to time it is necessary to update code used by different elements in a storage facility. Such code is commonly referred to as Licensed Maintenance Code (LMC). The Storage Facility includes several subsystems and components, referred to as updateable elements, each requiring its own unique update image and update commands.

Figure 1:
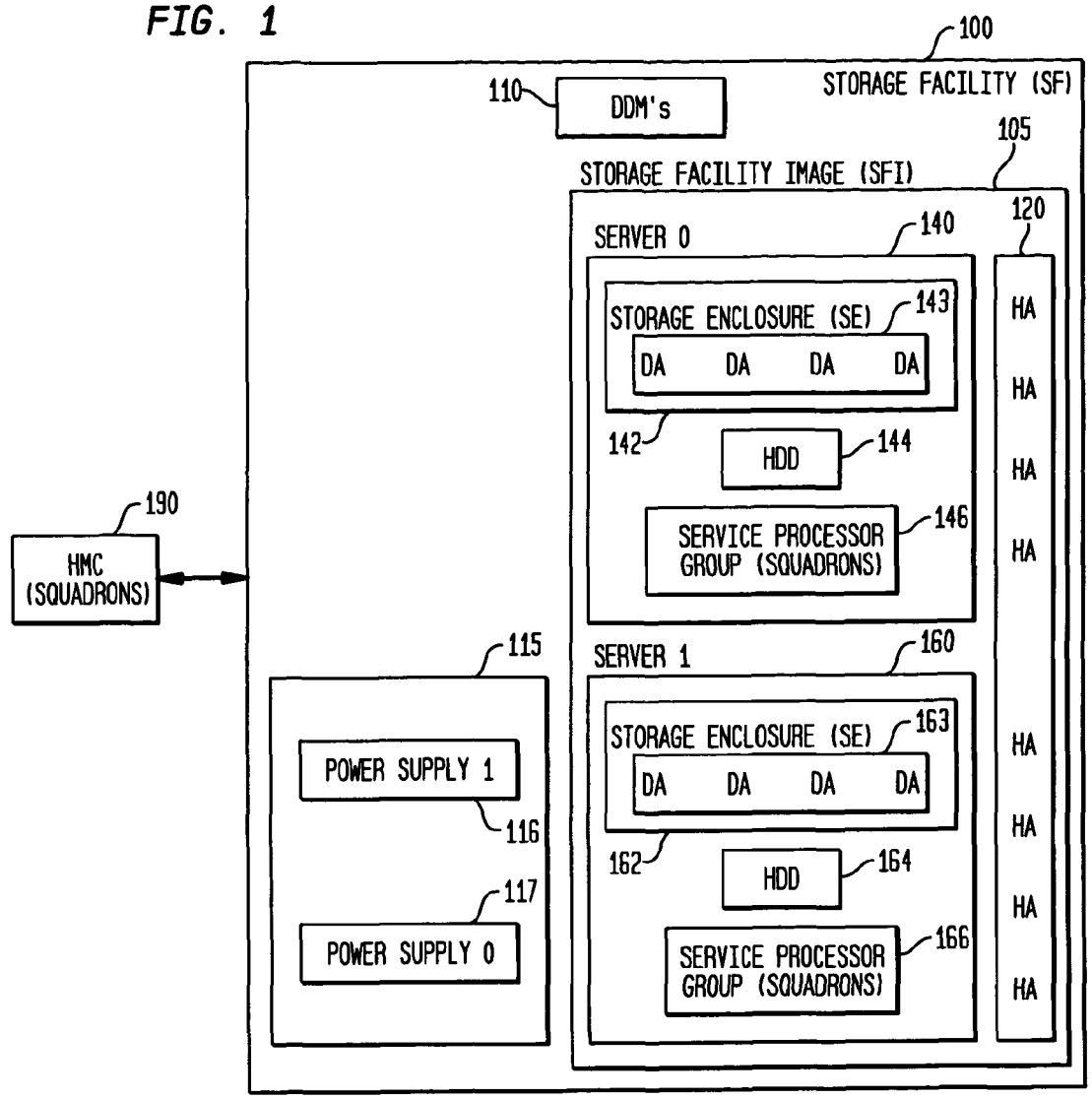
FIG. 1 illustrates a block diagram of a storage facility.

FIG. 1 illustrates a block diagram of a Storage Facility. An overall product includes a Hardware Management Console (HMC) 190, such as a laptop computer, and at least one Storage Facility (SF) 100. The example Storage Facility (SF) 100 includes at least one Storage Facility Image (SFI) 105 and a power supply group 115, which includes power supplies 116 and 117. In particular, the power supply group 115 includes a rack power control (RPC) and a primary power supply (PPS), which may be treated as one unit for the purposes of updating code. The SFI includes two servers (redundant servers) S0 (140) and S1 (160), and several disk drive modules (DDMs) 110, which are data storage devices for customer data, and several host adapters (HAs) 120. HAs are physical subunits of a storage server that provide the ability to attach to one or more host I/O interfaces. Each server 140, 160 includes at least one hard disk drive (HDD) 144, 164, also referred to as a logical partition (LPAR), at least two device adapters (DAs), 143, 163, housed in at least one storage enclosure (SE) 142, 162, and a service processor group 146, 166, respectively, (sometimes referred to as Squadrons or Computer-Electronic Complexes (CECs)). A CEC is the set of hardware facilities associated with each server 140, 160. DAs are physical components of the Storage Facility 100 that provide communication between the servers 140, 160 and the DDMs 110.

Each of the HDDs 144, 164 has an operating system running on it, such as IBM's AIX 5L operating system software, along with a driver, also referred to as SFI code. The SFI has numerous components with code for each component. The SFI code can be thought of as the main code which coordinates the activities of most of the other components and code. The invention involves, in part, updating the operating system and SFI code onto the HDDs 144, 164. The service processor groups 146, 166 and the HDDs 144, 164, respectively, combine to provide the server foundation, yet the server is incomplete without the other elements.

Typically, when a code update is needed, a technician is dispatched to the location of the Storage Facility and uses the HMC 190 to perform the updates. Alternatively, the customer may use the HMC 190 to perform the updates. Furthermore, the update may be done remotely. The HMC 190 may have the code for updating the elements stored locally, such as on a CD-ROM, or may access such code via a web site, for example. Generally, the updateable elements include the HDD 144, 164, host adapters 120, power supply component 115, DDMs 110, storage enclosures 142, 162, device adapters 143, 163, and service processor groups 146, 166.

Figure 2:
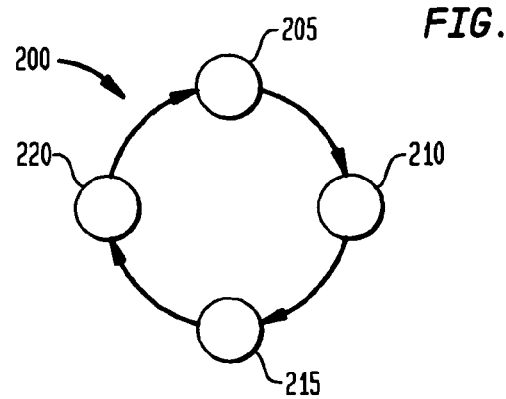
FIG. 2 illustrates a state machine for carrying out an update process.

FIG. 2 illustrates a state machine for carrying out an update process. The invention is used to coordinate the update actions for each of the updateable elements in the context of a fixed state machine that traverses different states in a fixed sequence. The traversal of the states is repeated in successive cycles or loops. For example, a simplified state machine 200 includes states 205, 210, 215 and 220, which are traversed one at a time in the sequence shown. In practice, the present invention can traverse dozens or hundreds of different states, although an action is not necessarily performed for each updateable element in each state. Each state is associated with one or more actions that are performed in updating the elements, as detailed below.

FIG. 3 illustrates a matrix showing an update process. A first column lists different states, also referred to as effectors, e.g., S-1 to S-17, as indicated in Table 1.

TABLE 1

| State: | Action: |
|---|---|
| (Packages states) | |
| S-1 | UpdatePackageSetLock |
| S-2 | UpdatePackageSetup |
| S-3 | UpdatePackagePreverify |

TABLE 1-continued

| State: | Action: |
|---|---|
| S-4 | UpdatePackageDistribute |
| S-5 | UpdatePackageUnpack |
| S-6 | UpdatePackageInstall |
| S-7 | UpdatePackageCleanup |
| S-8 | UpdatePackageUnlock |
| (Activate states) | |
| S-9 | UpdateActivateSetlock |
| S-10 | UpdateActivateSetup |
| S-11 | UpdateApplicationDeactivate |
| S-12 | UpdateElementDeactivate |
| S-13 | UpdateElementInstall |
| S-14 | UpdateElementActivate |
| S-15 | UpdateApplicationActivate |
| S-16 | UpdateActivateCleanup |
| S-17 | UpdateActivateUnlock |

Note that the states shown are examples only. Generally, states S-1 to S-8 can be considered package states, relating to distribution of a code package, or at least a portion of a code package, and states S-9 to S-17 can be considered activate states, relating to the activation of a distributed code package or the portion thereof. In particular, in states S-1 and S-2, a setup action is performed. In states S-3 to S-5, an image or code is distributed to one or more elements. In state S-6, the distributed code is installed at the element. In states S-7 and S-8, post-installation actions are performed. In states S-9 and S-10, pre-activation actions are performed. In states S-11 and S-12, an element is quiesced and rebooted. In state S-13, the code at an element is installed. In states S-14 and S-15, an element is rebooted and can resume its normal operation. In states S-16 and S-17, post activation actions are performed for an element.

The remaining columns list code packages, e.g., power and service processor group code packages, HDD code packages (e.g., AIX, AIX-PTF (program temporary fix), AIX-EFIX (electronic fix), and SFI), and DA, HA, SE and DDM code packages. The cells under each code package indicate a sequence number (e.g., 1, 2, 3 . . . ). A cell with only a sequence number indicates there is no operation of the state, e.g., no action is applied relative to the code package. The notation (S0, S1) indicates the action is applied to a code package to both servers S0 and S1 (or more than two servers, if present) essentially at the same time or one after another. The notation (S0) or (S1) in the heading of a separate sub-column indicates the action is applied to the code packages discretely for each server.

The sequence number in each cell indicates the sequence in which the actions of the states are carried out. In some cases, an action is applied to only one code package in a single state, in one traversal of the state machine. In other cases, an action is applied to multiple code packages in a single state, in one traversal of the state machine. Furthermore, an action can be applied to one or more code packages on multiple servers in a single state, in one traversal of the state machine. This can be achieved by grouping the code packages, as discussed further below. The correlation between the traversals or loops of the state machines and the sequence numbers is as indicated in Table 2.

TABLE 2

| Traversal No.: | Sequence Nos.: |
|---|---|
| 1 | 1–17 |
| 2 | 18–34 |

TABLE 2-continued

| Traversal No.: | Sequence Nos.: |
|---|---|
| 3 | 35–41 |
| 4 | 42–145 |
| 5 | 146–162 |
| 6 | 163–171 |
| 7 | 172–188 |
| 8 | 189–197 |
| 9 | 198–214 |
| 10 | 215–231 |
| 11 | 232–240 |

As indicated in FIG. 3, one traversal of the state machine is used for applying some of the actions to one server, while in other cases, one traversal of the state machine is used for applying some of the actions to multiple servers. Furthermore, regarding the host adapters (HAs), device adapters (DAs), and the disk drive modules (DDMs), a separate traversal of the state machine is used for applying the actions in the activate states S9-S17 to each element. Two HAs, HA1 and HA2, two DAs, DA1 and DA2, and two DDMs, DDM1 and DDM2, are provided as examples. In practice there can be many more than two of these elements, in which case additional traversals of the state machine are used for each element. Note also that a single traversal is used for activating the distributed code for the HDD-related code packages (AIX, AIX-PTF, AIX-EFIX and SFI) for servers S0 and S1 (traversal #4).

Generally, the product LMC update architecture follows a fixed state machine process that is typically implemented to update a single element. While it is possible to provide an implementation where a state machine is optimized to the flow of the update process, in other cases the update process must be conducted where the sequencing of the state machine from state to state is relatively fixed on a higher architectural level. The preset invention works within the confines of the fixed state machine to provide a flexible implementation where multiple element groupings and update sequences can be provided. The update sequence and order depend on the installation method and an update bundle grouping rules file, which is used by the HMC 190 to update the Storage Facility 100 with the different code packages, and which can be dynamically modified from one code load to the next. The invention provides a solution that provides flexibility within the fixed state machine's states, while also allowing the ability to loop over groups of states.

In particular, the update process can follow the predefined fixed state machine sequencing while providing the versatility to act on multiple elements within a given state as prescribed by a grouping scheme provided in the dynamic update bundle. A mechanism is provided to resequence through, or repeat, sets of states for multiple elements based on a grouping scheme provided in the dynamic update bundle. An advantage of the invention is therefore that it provides a way to update multiple elements within the architecture of a more restrictive single element state machine process. The invention also provides a way to dynamically change the element update order and the element update groupings by changing their group and sequence identifiers in the update bundle rather than changing the code that does the update, thereby providing flexibility without changing code. The invention also provides a way to correctly sequence through a list of updateable elements even when one or more of the updateable elements are removed from the update bundle by some arbitrary means.

The update process is designed to update all of the updateable elements. However, if the user or some other process decides to update a subset of those elements, then the update process will update only that subset of elements. This may achieved by the user by deselecting the elements from the displayed updateable element list at the beginning of the update process, or it may be accomplished by excluding the specific updateable elements from a Release Bundle. The Release Bundle is a file that contains a list of all of the updateable packages for a specific code release. A modified Release Bundle, or Update Bundle, contains a list of the packages that will be updated for the specific update process. The state machine will sequentially go through the Update Bundle and apply the packages from the Update Bundle to the corresponding updateable elements.

Furthermore, the invention provides a way to separate the updates on updateable elements by cluster, e.g., server, resource, a process that ensures that specific multiple cluster resources are not updated at the same time, even though parts of their updates may occur simultaneously.

A counterpart dependency is also determined. For example, the updating of one element may depend on the updating of another element. Or, the installation of one package on a given element may depend on the installation of another package.

In addition, the invention provides a mechanism to dynamically alter the package installation order within a given state of the state machine. In particular, the update bundle specifies if a set of packages must be operated on consecutively on a given counterpart element, or whether a package must be sequentially operated on for all counterpart elements prior to continuing with any subsequent packages, within a given state of the state machine.

The invention operates within the context of a fixed state machine and can include the following objects or attributes:

a. Update Bundle Rules File
    ii. Element Update Sequence (order)—defined by placement order in update bundle
    iii. Element Update Groupings
    iv. Element Update Sub-Groupings (Teams)
  b. Code to extract the Update Bundle information
  c. Code to sequence through the state machine and properly call update methods for each Element based on the Element, Group and Team values.
  d. Code to execute the specific update methods for each updateable element.

The following Update Bundle (Table 3) provides an example of how the invention can be implemented.

TABLE 3

Sample Update Bundle:

| Update Package | Group.Team |
|---|---|
| Pkg1 | A.1 |
| Pkg2 | A.2 |
| Pkg3 | B.1 |
| Pkg4 | B.2 |
| Pkg5 | B.2 |
| Pkg6 | B.3 |
| Pkg7 | C.1 |
| Pkg8 | C.2 |

The update bundle specifies the order in which specific update packages should be applied to the various updateable elements within the Storage Facility in the left-most column, "Update Packages", the order being from top to bottom. The package names are chosen for illustrative purposes only. The Group and Team assignments are specified in the second column, "Group.Team". For example, Pkg1 is in update group "A", Team "1". Each package may be associated with a Group and a Team, and each Group may have one or more Update Package members and one or more Team members. A Team, or sub-group, is a subset of its parent Group, and belongs to only one Group.

The state machine executes its states sequentially for each Group. After completing the distributing and activating states 1-N for Group A, where N is the number of states, the state machine repeats states 1-N for Group B, and so forth for the other groups. For each updateable element in a group, the packages can be operated on sequentially for the updateable element. For example, for state 1, Pkg3, which is the only member of B.1, can be operated on for all applicable updateable elements on so and then for S1. Pkg4 and Pkg5 are part of the same Team, B.2, so Pkg4 can be operated on for the first half of the server resources, e.g., so, followed by Pkg5 on that same resource. Then, Pkg4 and Pkg5 are operated on in the same manner on the second half of the server resources, e.g., S1. Finally Pkg6, which is the only member of B.3, can be operated on for all applicable updateable elements on S0 and then for S1.

Generally, all of the states are executed against the code packages and/or elements defined by the group and/or sub-group. Note that the states are sometimes executed against a package, as in the distribute states of the state machine, and, at other times, the state machine targets the updateable elements and its corresponding packages or just the updateable elements. Moreover, the process may be considered to be a parallel update process since both servers are updated together.

The process allows for multiple elements to be updated with one single pass through the state machine rather than a single pass for each updateable element. This is advantageous when the state actions for the multiple elements are tightly coupled. For example, two elements, e.g., the HDDs on S0 and S1, may need to be quiesced or rebooted as a pair. This update process allows both elements to be quiesced, updated and rebooted together, thereby minimizing the amount of time that both elements are unavailable to the user of the data storage facility. Another advantage is that the process allows tightly coupled packages, e.g., Team members, to be successfully updated on a single updateable element before proceeding to their update on a subsequent updateable element. This is advantageous to prevent adjacent updateable elements from being simultaneously corrupted. For example, Pkg4 and Pkg5 may be tightly coupled packages. If the installation were to be improperly broken with Pkg4 being installed on both elements, followed by Pkg5 failing on the first element, then the update process would stop without updating Pkg5 on the second element, resulting in both elements being unusable.

Figure 4:
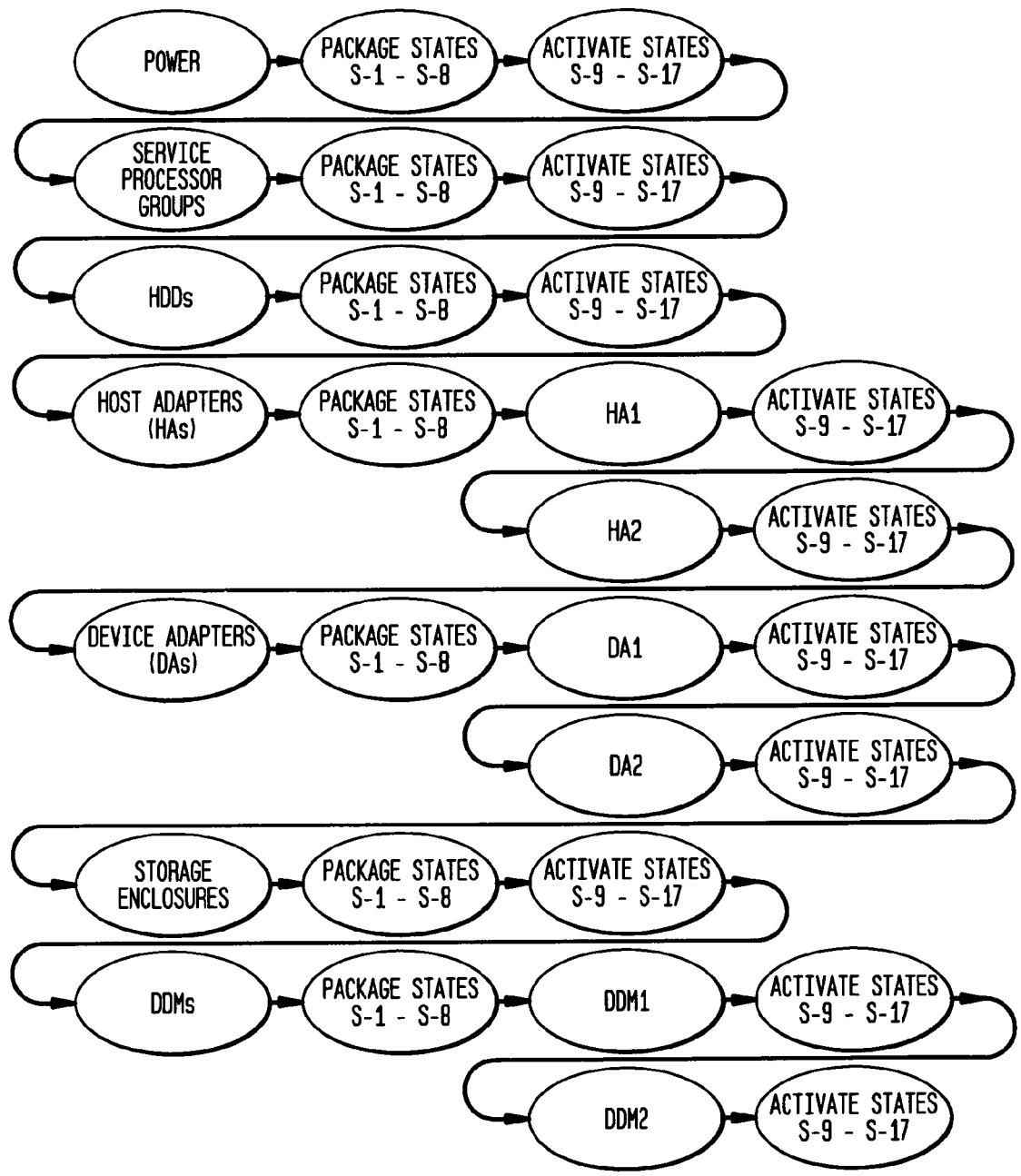
FIG. 4 illustrates an update flow process.

FIG. 4 illustrates an update flow process. The flow process of FIG. 4 provides a summary of the information presented in FIG. 3, but with reference to the physical updateable elements rather than the code packages. As mentioned, states S-1 to S-8 can be considered package states, relating to distribution of a code package, and states S-9 to S-17 can be considered activate states, relating to the activation of a distributed code package. The power component is the first element that is updated. The package states are traversed for the power component, and then the activate states. The service processor groups are processed next. The package states are traversed, and then the activate states. The HDDs are processed next. The package states are traversed, and then the activate states. Further details regarding the activate states for the HDD are provided in FIG. 5.

The HAs are processed next. The package states are traversed, the first HA (HA1) is selected, then the activate states are traversed. Next, the second HA (HA2) is selected, then the activate states are traversed. The process can be repeated accordingly for additional HAs. The DAs are processed next. The package states are traversed, the first DA (DA1) is selected, then the activate states are traversed. Next, the second DA (DA2) is selected, then the activate states are traversed. The process can be repeated accordingly for additional DAs.

The storage enclosures are processed next. The package states are traversed, then the activate states are traversed. The DDMs are processed next. The package states are traversed, the first DDM (DDM 1) is selected, then the activate states are traversed. Next, the second DDM (DDM2) is selected, then the activate states are traversed. The process can be repeated accordingly for additional DDMs.

Figure 5:
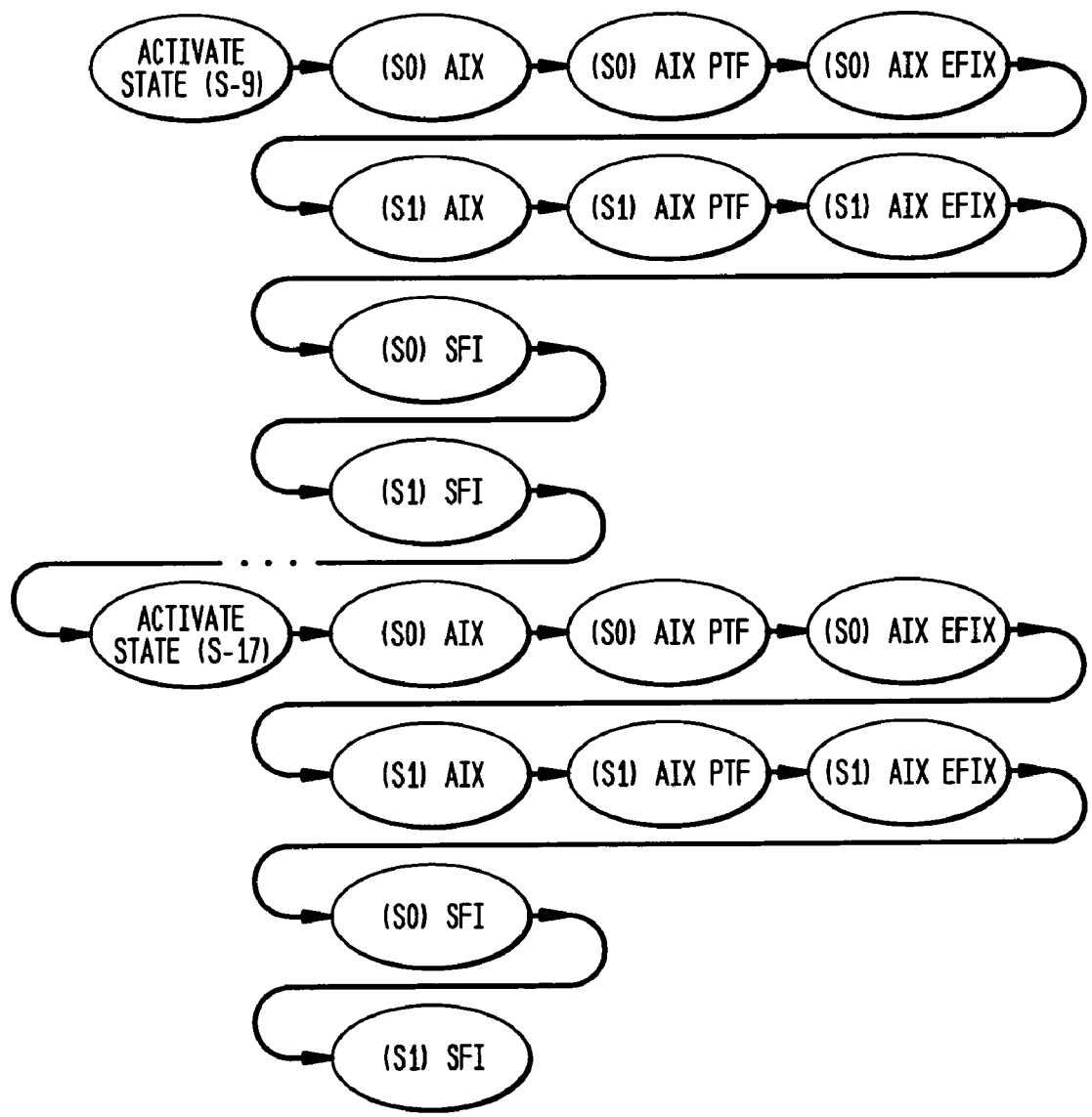
FIG. 5 illustrates activation states for the update flow process of FIG. 4, for servers S0 and S1.

FIG. 5 illustrates activation states for the update flow process of FIG. 5, for servers S0 and S1. In particular, FIG. 5 provides further details regarding the activate states for the HDDs. The process shown represents the details of the actions referred to by the notation "Activate states S-9 to S-17" in FIG. 4. Recalling that states S-9 to S-17 are considered activate states, the actions of the first of these states (S-9) is carried out to activate the code package for AIX for S0, then the code package for AIX PTF for S0, then the code package for AIX EFIX for S0, then the code package for AIX for S1, then the code package for AIX PTF for S1, then the code package for AIX EFIX for S1, then the code package for the SFI for S0, and finally the code package for the SFI for S1. The process is repeated accordingly until the last activate state (S-17) is reached. Again, the actions of the state S-17 are carried out, thereby completing the activation of the HDDs on S0 and S1. The process of FIG. 5 can be modified to include additional severs accordingly.

Accordingly, it can be seen that the invention provides a technique for distributing code packages to two (or more) servers on one pass through the distribute states of a state machine. The activation can also be performed on both servers in a single pass through the activate states of the state machine so that the servers are activated at the same time when elements on the different servers are tightly coupled and it is desired to minimize downtime caused by quiescing and rebooting. The elements and/or code packages can be grouped in a dynamically updateable manner to control the sequence of code distribution and activation.

Note that the invention described herein may be deployed on an existing or new computing infrastructure, such as a data storage facility, by integrating computer-readable code into the storage facility, where the code in combination with the storage facility is capable of performing a method for achieving the functionality described herein.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A computer-implemented method for deploying computing infrastructure, comprising integrating computer-readable code into a computing system comprising a data storage facility having at least a first server with an associated updateable element, and a second server with an associated updateable element, where the code in combination with the computing system is capable of coordinating update actions in the data storage facility by performing a method comprising:

setting a sequence for distributing a plurality of code packages to the associated updateable elements of the first and second servers according to different states of a fixed state machine;

wherein the states are traversed in sequence, and include at least one distribute state for distributing at least a portion of the plurality of code packages, and at least one activate state for activating the at least a portion of the plurality of code packages after it is distributed to the associated updateable elements of the first and second servers;

wherein sets of the states are repeated for multiple elements based on a grouping scheme specified in an update bundle used by the state machine to perform the update actions and the grouping scheme is dynamically changeable;

distributing the at least a portion of the plurality of code packages to the associated updateable elements of the first and second servers according to the sequence, and during the at least one distribute state; and activating, during the at least one activate state, and in a single traversal of the state machine, the at least a portion of the plurality of code packages that was distributed to the associated updateable elements of the first and second servers in the distributing step.

2. The method of claim 1, wherein:
the at least a portion of the plurality of code packages is distributed to the associated updateable elements of the first and second servers during the single traversal of the state machine.

3. The method of claim 1, further comprising:
grouping at least two of the plurality of code packages;
wherein the distributing and activating are responsive to the grouping.

4. The method of claim 3, wherein:
the grouping is achieved by configuring an external update bundle used by the state machine.

5. The method of claim 1, further comprising:
grouping at least two of the plurality of code packages in at least one group and at least one sub-group of the at least one group;
wherein the distributing and activating are responsive to the grouping.

6. The method of claim 1, wherein:
the associated updateable elements of the first and second servers comprise at least one of: a power supply component, a hard disk drive, a storage facility image, a host adapter, a device adapter, a storage enclosure, and a disk drive module.

7. The method of claim 1, wherein:
the associated updateable elements of the first and second servers comprise hard disk drives, and the plurality of code packages comprises operating system code for use by the hard disk drives.

8. At least one program storage device tangibly embodying a program of instructions executable by at least one processor to perform a method for coordinating update actions in a data storage facility having at least a first server with an associated updateable element, and a second server with an associated updateable element, the method comprising:

setting a sequence for distributing a plurality of code packages to the associated updateable elements of the first and second servers according to different states of a fixed state machine;

wherein the states are traversed in sequence, and include at least one distribute state for distributing at least a portion of the plurality of code packages, and at least one activate state for activating the at least a portion of the plurality of code packages after it is distributed to the associated updateable elements of the first and second servers;

wherein sets of the states are repeated for multiple elements based on a grouping scheme specified in an update bundle used by the state machine to perform the update actions and the grouping scheme is dynamically changeable;

distributing the at least a portion of the plurality of code packages to the associated updateable elements of the first and second servers according to the sequence, and during the at least one distribute state; and activating, during the at least one activate state, and in a single traversal of the state machine, the at least a portion of the plurality of code packages that was distributed to the associated updateable elements of the first and second servers in the distributing step.

9. The at least one program storage device of claim 8, wherein:
the at least a portion of the plurality of code packages is distributed to the associated updateable elements of the first and second servers during the single traversal of the state machine.

10. The at least one program storage device of claim 8, wherein the method further comprises:
grouping at least two of the plurality of code packages;
wherein the distributing and activating are responsive to the grouping.

11. The at least one program storage device of claim 10, wherein:
the grouping is achieved by configuring an external update bundle used by the state machine.

12. The at least one program storage device of claim 8, wherein the method further comprises:
grouping at least two of the plurality of code packages in at least one group and at least one sub-group of the at least one group;
wherein the distributing and activating are responsive to the grouping.

13. The at least one program storage device of claim 8, wherein:
the associated updateable elements of the first and second servers comprise at least one of: a power supply component, a hard disk drive, a storage facility image, a host adapter, a device adapter, a storage enclosure, and a disk drive module.

14. The at least one program storage device of claim 8, wherein:
the associated updateable elements of the first and second servers comprise hard disk drives, and the plurality of code packages comprises operating system code for use by the hard disk drives.

15. A data storage facility, comprising:
at least a first server with an associated updateable element, and a second server with an associated updateable element;
at least one processor; and
at least one program storage device tangibly embodying a program of instructions executable by the at least one processor to perform a method for coordinating update actions in the data storage facility by performing a method comprising:

setting a sequence for distributing a plurality of code packages to the associated updateable elements of the first and second servers according to different states of a fixed state machine;

wherein sets of the states are repeated for multiple elements based on a grouping scheme specified in an update bundle used by the state machine to perform the update actions and the grouping scheme is dynamically changeable;

wherein the states are traversed in sequence, and include at least one distribute state for distributing at least a portion of the plurality of code packages, and at least one activate state for activating the at least a portion of the plurality of code packages after it is distributed to the associated updateable elements of the first and second servers;

distributing the at least a portion of the plurality of code packages to the associated updateable elements of the first and second servers according to the sequence, and during the at least one distribute state; and activating, during the at least one activate state, and in a single traversal of the state machine, the at least a portion of the plurality of code packages that was distributed to the associated updateable elements of the first and second servers in the distributing step.

16. The data storage facility of claim 15, wherein:
the associated updateable elements of the first and second servers comprise at least one of: a power supply component, a hard disk drive, a storage facility image, a host adapter, a device adapter, a storage enclosure, and a disk drive module.

17. The data storage facility of claim 15, wherein:
the associated updateable elements of the first and second servers comprise hard disk drives, and the plurality of code packages comprises operating system code for use by the hard disk drives.

18. A computer-implemented method for deploying computing infrastructure, comprising integrating computer-readable code into a computing system comprising a data storage facility having at least a first server with an associated updateable element, and a second server with an associated updateable element, where the code in combination with the computing system is capable of coordinating update actions in the data storage facility by performing a method comprising:

setting a sequence for distributing a plurality of code packages to the associated updateable elements of the first and second servers according to different states of a fixed state machine;

wherein sets of the states are repeated for multiple elements based on grouping scheme specified in an update bundle used by the state machine to perform the update actions and the grouping scheme is dynamically changeable;

wherein the states are traversed in sequence, and include at least one distribute state for distributing at least a portion of the plurality of code packages, and at least one activate state for activating the at least a portion of the plurality of code packages after it is distributed to the associated updateable elements of the first and second servers;

grouping at least two of the plurality of code packages;

distributing, responsive to the grouping, the at least a portion of the plurality of code packages to the associated updateable elements of the first and second servers according to the sequence, and during the at least one distribute state; and activating, responsive to the grouping, during the at least one activate state, and in a single traversal of the state machine, the at least a portion of the plurality of code packages that was distributed to the associated updateable elements of the first and second servers in the distributing step.

19. The method of claim 18, wherein:
the at least a portion of the plurality of code packages is distributed to the associated updateable elements of the first and second servers during the single traversal of the state machine.

20. The method of claim 18, wherein:
the grouping is achieved by configuring an external update bundle used by the state machine.

21. The method of claim 18, further comprising:
grouping the at least two of the plurality of code packages in at least one group and at least one sub-group of the at least one group;
wherein the distributing and activating are responsive to the grouping of the at least one group and the at least one sub-group.

22. The method of claim 18, wherein:
the associated updateable elements of the first and second servers comprise at least one of: a power supply component, a hard disk drive, a storage facility image, a host adapter, a device adapter, a storage enclosure, and a disk drive module.

23. The method of claim 18, wherein:
the associated updateable elements of the first and second servers comprise hard disk drives, and the plurality of code packages comprises operating system code for use by the hard disk drives.

24. At least one program storage device tangibly embodying a program of instructions executable by at least one processor to perform a method for coordinating update actions in a data storage facility having at least a first server with an associated updateable element, and a second server with an associated updateable element, the method comprising:

setting a sequence for distributing a plurality of code packages to the associated updateable elements of the first and second servers according to different states of a fixed state machine;

wherein sets of the states are repeated for multiple elements based on a grouping scheme specified in an update bundle used by the state machine to perform the update actions and the grouping scheme is dynamically changeable;

wherein the states are traversed in sequence, and include at least one distribute state for distributing at least a portion of the plurality of code packages, and at least one activate state for activating the at least a portion of the plurality of code packages after it is distributed to the associated updateable elements of the first and second servers;

grouping at least two of the plurality of code packages;

distributing, responsive to the grouping, the at least a portion of the plurality of code packages to the associated updateable elements of the first and second servers according to the sequence, and during the at least one distribute state; and activating, responsive to the grouping, during the at least one activate state, and in a single traversal of the state machine, the at least a portion of the plurality of code packages that was distributed to the associated updateable elements of the first and second servers in the distributing step.

25. The at least one program storage device of claim 24, wherein:
the at least a portion of the plurality of code packages is distributed to the associated updateable elements of the first and second servers during the single traversal of the state machine.

26. The at least one program storage device of claim 24, wherein:
the grouping is achieved by configuring an external update bundle used by the state machine.

27. The at least one program storage device of claim 24, wherein the method further comprises:
grouping the at least two of the plurality of code packages in at least one group and at least one sub-group of the at least one group;
wherein the distributing and activating are responsive to the grouping of the at least one group and the at least one sub-group.

28. The at least one program storage device of claim 24, wherein:
the associated updateable elements of the first and second servers comprise at least one of: a power supply component, a hard disk drive, a storage facility image, a host adapter, a device adapter, a storage enclosure, and a disk drive module.

29. The at least one program storage device of claim 24, wherein:
the associated updateable elements of the first and second servers comprise hard disk drives, and the plurality of code packages comprises operating system code for use by the hard disk drives.

30. A data storage facility, comprising:
at least a first server with an associated updateable element, and a second server with an associated updateable element;
at least one processor; and
at least one program storage device tangibly embodying a program of instructions executable by the at least one processor to perform a method for coordinating update actions in the data storage facility by performing a method comprising:
setting a sequence for distributing a plurality of code packages to the associated updateable elements of the first and second servers according to different states of a fixed state machine;
wherein sets of the states are repeated for multiple elements based on a grouping scheme specified in an update bundle used by the state machine to perform the update actions and the grouping scheme is dynamically changeable;
wherein the states are traversed in sequence, and include at least one distribute state for distributing at least a portion of the plurality of code packages, and at least one activate state for activating the at least a portion of the plurality of code packages after it is distributed to the associated updateable elements of the first and second servers;
grouping at least two of the plurality of code packages;
distributing, responsive to the grouping, the at least a portion of the plurality of code packages to the associated updateable elements of the first and second servers according to the sequence, and during the at least one distribute state; and
activating, responsive to the grouping, during the at least one activate state, and in a single traversal of the state machine, the at least a portion of the plurality of code packages that was distributed to the associated updateable elements of the first and second servers in the distributing step.

31. The data storage facility of claim 30, wherein:
the associated updateable elements of the first and second servers comprise at least one of: a power supply component, a hard disk drive, a storage facility image, a host adapter, a device adapter, a storage enclosure, and a disk drive module.

32. The data storage facility of claim 30, wherein:
the associated updateable elements of the first and second servers comprise hard disk drives, and the plurality of code packages comprises operating system code for use by the hard disk drives.

33. A computer-implemented method for deploying computing infrastructure, comprising integrating computer-readable code into a computing system comprising a data storage facility having at least a first server with an associated updateable element, and a second server with an associated updateable element, where the code in combination with the computing system is capable of coordinating update actions in the data storage facility by performing a method comprising:
setting a sequence for distributing a plurality of code packages to the associated updateable elements of the first and second servers according to different states of a fixed state machine;
wherein sets of the states are repeated for multiple elements based on a grouping scheme specified in an update bundle used by the state machine to perform the update actions and the grouping scheme is dynamically changeable;
wherein the states are traversed in sequence, and include at least one distribute state for distributing at least a portion of the plurality of code packages, and at least one activate state for activating the at least a portion of the plurality of code packages after it is distributed to the associated updateable elements of the first and second servers;
distributing the at least a portion of the plurality of code packages to the associated updateable elements of the first and second servers according to the sequence, during the at least one distribute state, and during a single traversal of the state machine; and
activating, during the at least one activate state, and during the single traversal of the state machine, the at least a portion of the plurality of code packages that was distributed to the associated updateable elements of the first and second servers in the distributing step.

34. The method of claim 33, further comprising:
grouping at least two of the plurality of code packages;
wherein the distributing and activating are responsive to the grouping.

35. The method of claim 34, wherein:
the grouping is achieved by configuring an external update bundle used by the state machine.

36. The method of claim 33, further comprising:
grouping at least two of the plurality of code packages in at least one group and at least one sub-group of the at least one group;
wherein the distributing and activating are responsive to the grouping.

37. At least one program storage device tangibly embodying a program of instructions executable by at least one processor to perform a method for coordinating update actions in a data storage facility having at least a first server with an associated updateable element, and a second server with an associated updateable element, the method comprising:
- setting a sequence for distributing a plurality of code packages to the associated updateable elements of the first and second servers according to different states of a fixed state machine;
- wherein sets of the states are repeated for multiple elements based on a grouping scheme specified in an update bundle used by the state machine to perform the update actions and the grouping scheme is dynamically changeable;
- wherein the states are traversed in sequence, and include at least one distribute state for distributing at least a portion of the plurality of code packages, and at least one activate state for activating the at least a portion of the plurality of code packages after it is distributed to the associated updateable elements of the first and second servers;
- distributing the at least a portion of the plurality of code packages to the associated updateable elements of the first and second servers according to the sequence, during the at least one distribute state, and during a single traversal of the state machine; and
- activating, during the at least one activate state, and during the single traversal of the state machine, the at least a portion of the plurality of code packages that was distributed to the associated updateable elements of the first and second servers in the distributing step.

38. A data storage facility, comprising:
- at least a first server with an associated updateable element, and a second server with an associated updateable element;
- at least one processor; and
- at least one program storage device tangibly embodying a program of instructions executable by the at least one processor to perform a method for coordinating update actions in the data storage facility by performing a method comprising:
- setting a sequence for distributing a plurality of code packages to the associated updateable elements of the first and second servers according to different states of a fixed state machine;
- wherein sets of the states are repeated for multiple elements based on a grouping scheme specified in an update bundle used by the state machine to perform the update actions and the growing scheme is dynamically changeable;
- wherein the states are traversed in sequence, and include at least one distribute state for distributing at least a portion of the plurality of code packages, and at least one activate state for activating the at least a portion of the plurality of code packages after it is distributed to the associated updateable elements of the first and second servers;
- distributing the at least a portion of the plurality of code packages to the associated updateable elements of the first and second servers according to the sequence, during the at least one distribute state, and during a single traversal of the state machine; and
- activating, during the at least one activate state, and during the single traversal of the state machine, the at least a portion of the plurality of code packages that was distributed to the associated updateable elements of the first and second servers in the distributing step.

* * * * *